United States Patent Office 3,234,207
Patented Feb. 8, 1966

3,234,207
WATER-SOLUBLE YELLOW MONOAZO-DYE-STUFFS AND PROCESS FOR PREPARING THEM
Klaus Berner and Arthur Siebert, Frankfurt am Main, and Karl Sommer, Konigstein, Taunus, Germany, assignors to Farbwerke Hoechst Aktiengesellschaft vormals Meister Lucius & Brüning, Frankfurt am Main, Germany, a corporation of Germany
No Drawing. Filed May 24, 1963, Ser. No. 282,857
Claims priority, application Germany, May 29, 1962, F 36,926
6 Claims. (Cl. 260—162)

The present invention relates to water-soluble yellow monoazo-dyestuffs and to a process for preparing them; more particularly it relates to water-soluble monoazo-dyestuffs having the following general formula

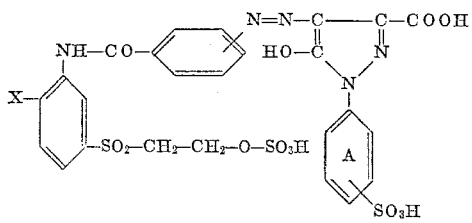

in which the azo group stands in meta- or para-position to the grouping NH—CO, X represents a hydrogen atom or the COOH—group, and the benzene nucleus A may be substituted by chlorine atoms and methyl groups.

It has been found that valuable, easily water-soluble yellow monoazo-dyestuffs having the general formula

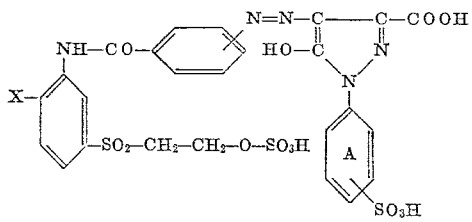

in which the azo group stands in meta-or para-position to the grouping NH—CO, X represents a hydrogen atom or the COOH— group, and the benzene nucleus A may be substituted by chlorine atoms and methyl groups, are obtained by diazotizing amines having the general formula

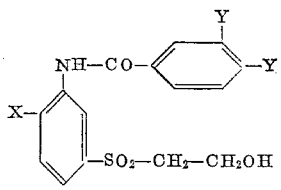

in which X represents a hydrogen atom or the COOH— group, one Y stands for the NH$_2$— group and the other Y for a hydrogen atom, in the form of their acid sulfuric acid esters and by coupling with pyrazolones of the general formula

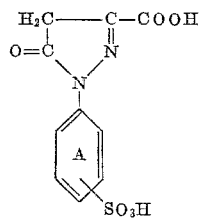

in which the benzene nucleus A may be substituted by chlorine atoms and methyl groups. The amines used as starting substances can be prepared, for example, by reacting nitrobenzoyl chlorides in an aqueous solution with 1-aminobenzene-3-β-hydroxy-ethylsulfone or 2-aminobenzoic acid-4-β-hydroxyethylsulfone in the presence of alkalis and subsequently reducing the nitro group to the amino group.

As coupling components there may be used, for example, the following pyrazolones:

1-(3'-sulfophenyl)-5-pyrazolone-3-carboxylic acid,
1-(4'-sulfophenyl)-5-pyrazolone-3-carboxylic acid,
1-(2'-chloro-5'-sulfophenyl)-5-pyrazolone-3-carboxylic acid,
1-(2'-methyl-4'-sulfophenyl)-5-pyrazolone-3-carboxylic acid,
1-(2',5'-dichloro-4'-sulfophenyl)-5-pyrazolone-3-carboxylic acid,
1-(2'-methyl-3'-chloro-6'-sulfophenyl)-5-pyrazolone-3-carboxylic acid.

The novel dyestuffs thus obtainable can be fixed on cellulose fibers in the presence of agents giving an alkaline reaction and yield brilliant yellow dyeings and prints having a good fastness to wet processing and to light. Their particular value resides in the fact that in contradistinction to dyestuffs containing derivatives of the 1-phenyl-3-methylpyrazolone as coupling component they yield dyeings and prints which show a good fastness when exposed to light in wet state. Whereas wet dyeings prepared with dyestuffs, the pyrazolone nucleus of which contains a methyl group in 3-position, above all in mixtures for green shades with copper phthalocyanine dyestuffs and at pH-values greater than 7.0 are severely damaged when exposed to sun light, dyeings and prints prepared with the dyestuffs of the present invention show under comparable conditions a distinctly better behavior. In addition to this, the dyestuffs are distinguished by a very good affinity, a high rate of fixation and an excellent solubility.

The following examples serve to illustrate the invention, but they are not intended to limit it thereto, the parts being by weight unless otherwise stated and the relationship of parts by weight to parts by volume being the same as that of the kilogram to the liter.

Example 1

150 parts of concentrated sulfuric acid of 98% strength are added to 12.7 parts of nitrosylsulfuric acid and 32 parts of 1-(4'-aminobenzoylamino)-benzene-3-β-hydroxy-ethylsulfone (melting point: 150–152° C.) are introduced. The temperature should not exceed 30° C. When all is dissolved, the solution is stirred for 3 hours at room temperature and subsequently introduced in 500 parts of ice and 300 parts of water. The precipitated diazo compound is filtered off and interspersed, while still moist, in a solution adjusted to a pH-value of 7.0 with sodium carbonate and containing 29.3 parts of 1-(4'-sulfophenyl)-5-pyrazolone-3-carboxylic acid in 200 parts of water. Subsequently 20 parts of crystalline sodium acetate are added. The whole is then stirred for 1 hour, until the coupling is complete. 4 parts of a filtration adjuvant are added to the coupling liquor, the mixture is heated with direct steam to 70° C. and clarified by filtration. The filtration residue is washed with 50 parts of hot water. The combined filtrates are evaporated to dryness on the steam bath. 89 parts of an orange powder are obtained which dissolves in water to give a yellow solution and is suitable as dyestuff for dyeing and printing. There are thus obtained on natural and regenerated cellulose fibers from salt-containing dyeing liquors in the cold or in the heat in the presence of alkalis greenish yellow dyeings having a good fastness to wet processing, a good fastness to light, a high brilliance and, especially at pH-values greater than 7.0, an excellent fastness when exposed to light in wet state. Their excellent fastness when exposed to light in wet state is particularly valuable with dyeings prepared with mixtures for green shades containing copper phthalocyanine dyestuffs. A good dyeing result is also obtained, when impregnating or printing cellulose fibers with an aqueous solution of the dyestuff and allowing alkalis which may be applied to the goods prior to, simultaneously with or after the dyestuff to act in the cold or in the heat upon the goods thus treated; depending on the temperature conditions and on the nature of the alkalis selected the period of action ranges from a few seconds to about 24 hours.

*Example 2*

80 parts of concentrated sulfuric acid are cooled, while stirring, in a freezing mixture, and 6.9 parts of pulverized and dried sodium nitrite are introduced so slowly that the temperature does not exceed $+10°$ C. After the introduction the mixture is stirred for another 10 minutes, the freezing mixture is removed and replaced by cold water. When the content of the vessel has adopted the temperature of the water, the whole is heated slowly to 70° C., and this temperature is maintained for about 30 minutes, while stirring continuously, until the sodium nitrite is entirely dissolved. The solution is then cooled to room temperature, 90 parts of concentrated sulfuric acid are added, and 32 parts of 1-(3'-aminobenzoylamino)-benzene-3-$\beta$-hydroxy-ethylsulfone (melting point: 150–151° C.) are introduced. The temperature should not exceed 30° C. When all is dissolved, the solution is stirred for 3 hours at room temperature and subsequently run into 500 parts of ice and 30 parts of water. The precipitated diazo compound is filtered off and interspersed, while still moist, in a solution adjusted to a pH-value of 7.0 with sodium carbonate and containing 35.3 parts of 1-(2',5' - dichloro - 4' - sulfophenyl)-5-pyrazolone-3-carboxylic acid in 150 parts of water. Subsequently 150 parts by volume of a 4 N-sodium acetate solution are added dropwise, and the whole is after-stirred for 1 hour, until the coupling is complete. The dyestuff solution is then heated to 50° C., 30 parts of crystalline potassium chloride are interspersed in the solution, and stirring is continued for 20 hours. The precipitated dyestuff is filtered off and dried at 70° C. 90 parts of a yellow powder are obtained which dissolves in water to give a yellow solution. It may be used as deystuff for dyeing and printing, as described in Example 1, whereby greenish yellow dyeings having good fastness properties are obtained.

*Example 3*

38.6 parts of 2-(4'-aminobenzoylamino)-benzoic acid-4-$\beta$-hydroxy-ethylsulfone in the form of the sodium salt (melting point: 318–322° C. with decomposition) are introduced into 150 parts of concentrated sulfuric acid of 98% strength and 12.7 parts of nitrosylsulfuric acid. The temperature should not exceed 30° C. When all is dissolved, the solution is stirred for 3 hours at room temperature and subsequently run into 500 parts of ice and 300 parts of water. The precipitated diazo compound is filtered off and introduced, while still moist, into a solution adjusted to a pH-value of 7.0 with sodium carbonate and containing 28.4 parts of 1-(3'-sulfophenyl)-5-pyrazolone-3-carboxylic acid in 300 parts of water. Then 30 parts of crystalline sodium acetate are added. The mixture is stirred for 2 hours, until the coupling is complete, heated to 40° C., and 70 parts of potassium chloride are added to the dyestuff solution. Immediately after the introduction of the salt the dyestuff begins to precipitate and is filtered off after stirring for 2 hours. After drying at 70° C., 75 parts of an orange powder are obtained which dissolves in water to give an orange solution, is suitable as dyestuff for dyeing and printing and may be fixed on cellulose fibers in the cold or in the heat in the presence of agents giving an alkaline reaction. Brilliant, reddish yellow dyeings and prints are obtained which have a good fastness to wet processing, a good fastness to light and, especially at pH-values greater than 7.0, an excellent fastness when exposed to light in wet state.

*Example 4*

150 parts of concentrated sulfuric acid of 98% strength are added to 12.7 parts of nitrosylsulfuric acid and 38.6 parts of 2-(3'-aminobenzoylamino)-benzoic acid-4-$\beta$-hydroxy-ethylsulfone in the form of the sodium salt (melting point: 332–333° C. with decomposition) are introduced. The temperature should not exceed 30° C. When all is dissolved, the solution is stirred for 3 hours at room temperature and subsequently run into 500 parts of ice and 300 parts of water. The precipitated diazo compound is filtered off and introduced, while still moist, into a solution adjusted to a pH-value of 7.0 with sodium carbonate and containing 33.3 parts of 1-(2'-methyl-3'-chloro-6'-sulfophenyl)-5-pyrazolone-3-carboxylic acid in 300 parts of water. Subsequently further 30 parts of crystalline sodium acetate are added. When the coupling is complete, the mixture is heated to 50° C., and 50 parts of potassium chloride are added to the dyestuff solution. The whole is stirred over night, the precipitated dyestuff is filtered off and dried at 70° C. 70 parts of a yellow dyestuff are obtained which dissolves in water to give a yellow solution and, as described in Example 3, yields on cellulose fibers greenish yellow dyeings and prints having good fastness properties.

*Example 5*

The diazo compound prepared as described in Example 1 is interspersed, while still moist, in a solution adjusted to a pH-value of 7.0 with sodium carbonate and containing 31.9 parts of 1-(2'-chloro-5'-sulfophenyl)-5-pyrazolone-3-carboxylic acid in 200 parts of water. Subsequently 20 parts of crystalline sodium acetate are added. The whole is then stirred for 1 hour, until the coupling is complete. 4 parts of a filtration adjuvant are added to the coupling liquor; the whole is heated with direct steam to 70° C. and clarified by filtration. The filtration residue is washed with 50 parts of hot water. The combined filtrates are evaporated to dryness on the steam bath. 75 parts of a yellow powder are obtained which dissolves in water to give a yellow solution. As described in Example 1, it may be used as dyestuff for dyeing and printing, whereby greenish yellow dyeings having good fastness properties are obtained.

We claim:

1. The water-soluble monoazo-dyestuffs having the formula

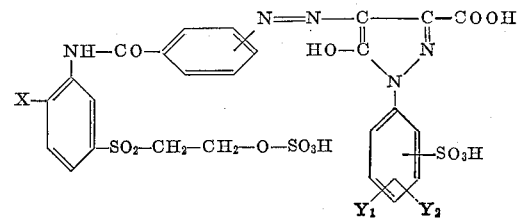

in which the azo group stands in a position other than ortho to the grouping —NH—CO—, X represents a member of the group consisting of hydrogen and carboxyl, and $Y_1$, $Y_2$ represent members of the group consisting of hydrogen, chlorine and methyl.

2. The water-soluble monoazo-dyestuff having the formula

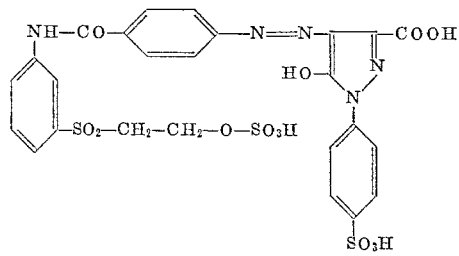

3. The water-soluble monoazo-dyestuff having the formula

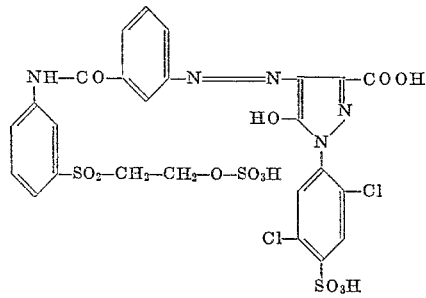

4. The water-soluble monoazo-dyestuff having the formula

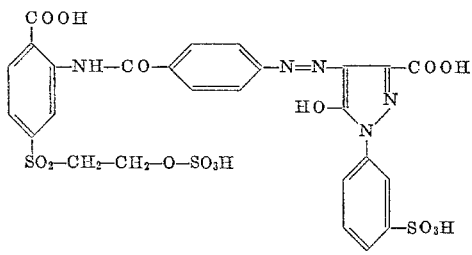

5. The water-soluble monoazo-dyestuff having the formula

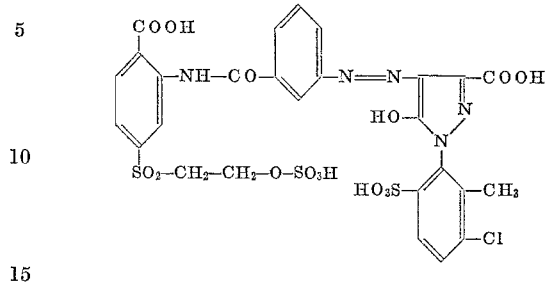

6. The water-soluble monoazo-dyestuff having the formula

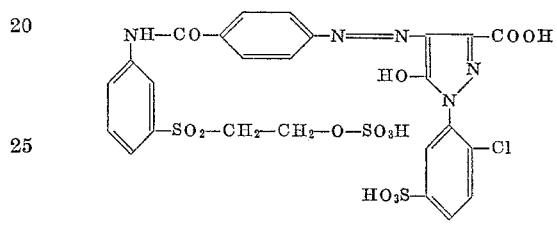

References Cited by the Examiner
UNITED STATES PATENTS

| | | | |
|---|---|---|---|
| 1,874,474 | 8/1932 | Eichwede et al. | 260—162 |
| 1,876,884 | 9/1932 | Eichwede et al. | 260—162 |
| 2,220,598 | 11/1940 | Fischer | 260—162 X |
| 2,895,785 | 7/1959 | Alsberg et al. | 260—163 X |

FOREIGN PATENTS 623,328  7/1961  Canada.

CHARLES B. PARKER, *Primary Examiner.*